(12) United States Patent
Ooe

(10) Patent No.: US 6,330,238 B1
(45) Date of Patent: Dec. 11, 2001

(54) MULTICAST TRANSMISSION METHOD

(75) Inventor: Kazuichi Ooe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/168,857

(22) Filed: Oct. 9, 1998

(30) Foreign Application Priority Data

Oct. 31, 1997 (JP) .................................................. 9-299704
Sep. 16, 1998 (JP) ................................................ 10-261580

(51) Int. Cl.[7] .................................................. H04L 12/56
(52) U.S. Cl. ........................................... 370/390; 370/432
(58) Field of Search ................................ 370/390, 312, 370/432

(56) References Cited

U.S. PATENT DOCUMENTS

| 5,361,256 | * | 11/1994 | Doeringer et al. ............ 370/390 |
| 5,444,702 | | 8/1995 | Burnett et al. . |
| 5,457,683 | | 10/1995 | Robins . |
| 5,511,168 | * | 4/1996 | Perlman et al. ............... 370/390 |
| 5,898,686 | * | 4/1999 | Virgile ........................... 370/381 |
| 5,940,391 | * | 8/1999 | Malkin et al. .................. 370/390 |
| 6,181,697 | * | 1/2001 | Nurenberg et al. ............ 570/390 |

FOREIGN PATENT DOCUMENTS

| 02-133856 | 5/1990 | (JP) . |
| 02-503121 | 9/1990 | (JP) . |
| 02-297656 | 12/1990 | (JP) . |
| 05-324545 | 12/1993 | (JP) . |

* cited by examiner

*Primary Examiner*—Douglas Olms
*Assistant Examiner*—Ken Vanderpuye
(74) *Attorney, Agent, or Firm*—Staas & Halsey, LLP

(57) ABSTRACT

The present invention relates to a multicast transmission method which is capable of realizing a multicast function while maintaining the independence of each of nodes concurrently with minimizing the traffic on a communication network. In the multicast transmission method according to this invention, a data transmitting node, in which a multicast transmission request occurs, adds a multicast address to a data send message and then broadcasts the data send message plus multicast address to all the nodes, while each of the nodes receiving the multicast address refers to its own multicast table to decide whether or not a multicast address coincident with the received multicast address exists in the multicast table. If the same multicast address exists, the node makes a request for the transmission of data responding to the multicast transmission request toward the data transmitting node through the use of a basic communication function, so that the data is transmitted from the data transmitting node to the node making the data transmission request. This invention is applicable to communication networks employing a protocol such as TCP/IP (Transmission Control Protocol/Internet Protocol).

8 Claims, 11 Drawing Sheets

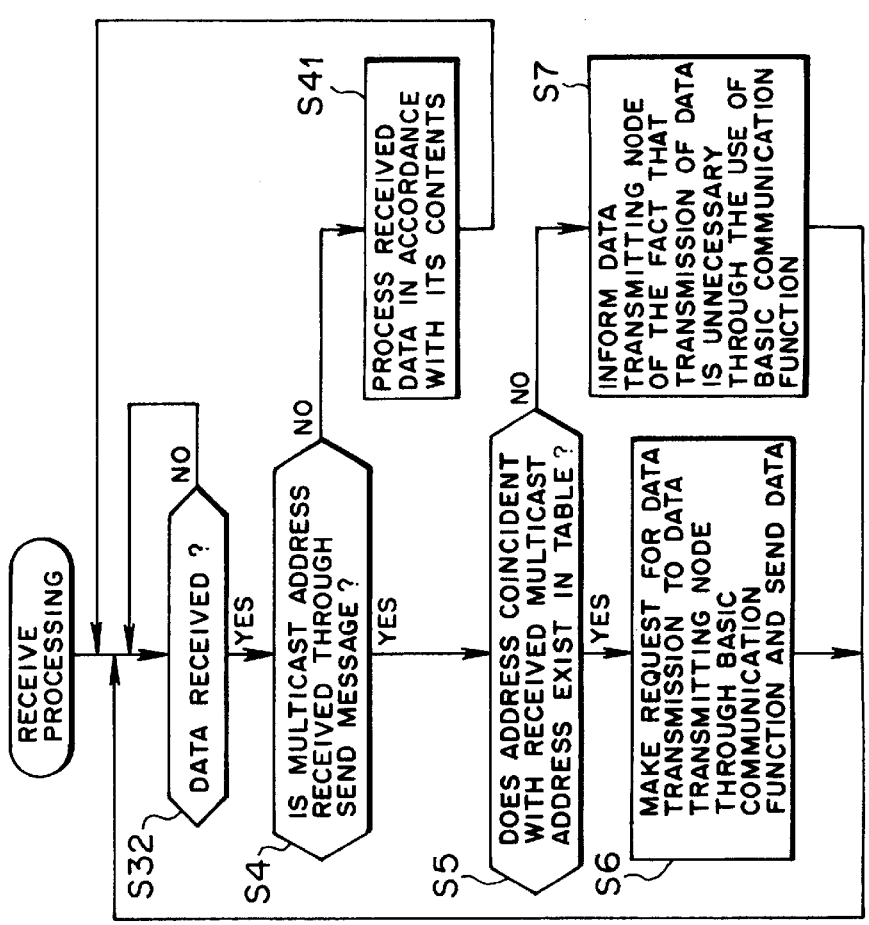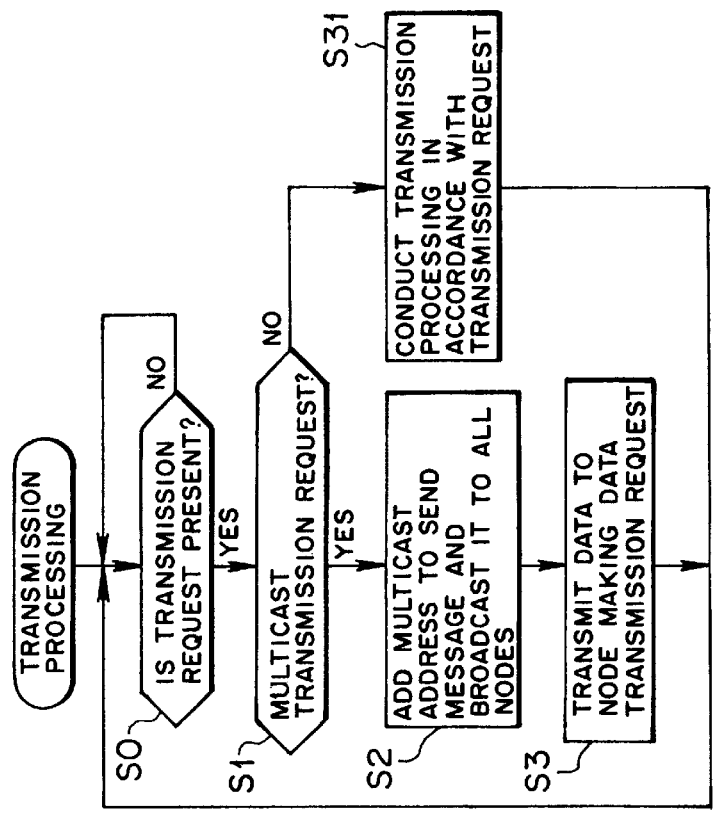

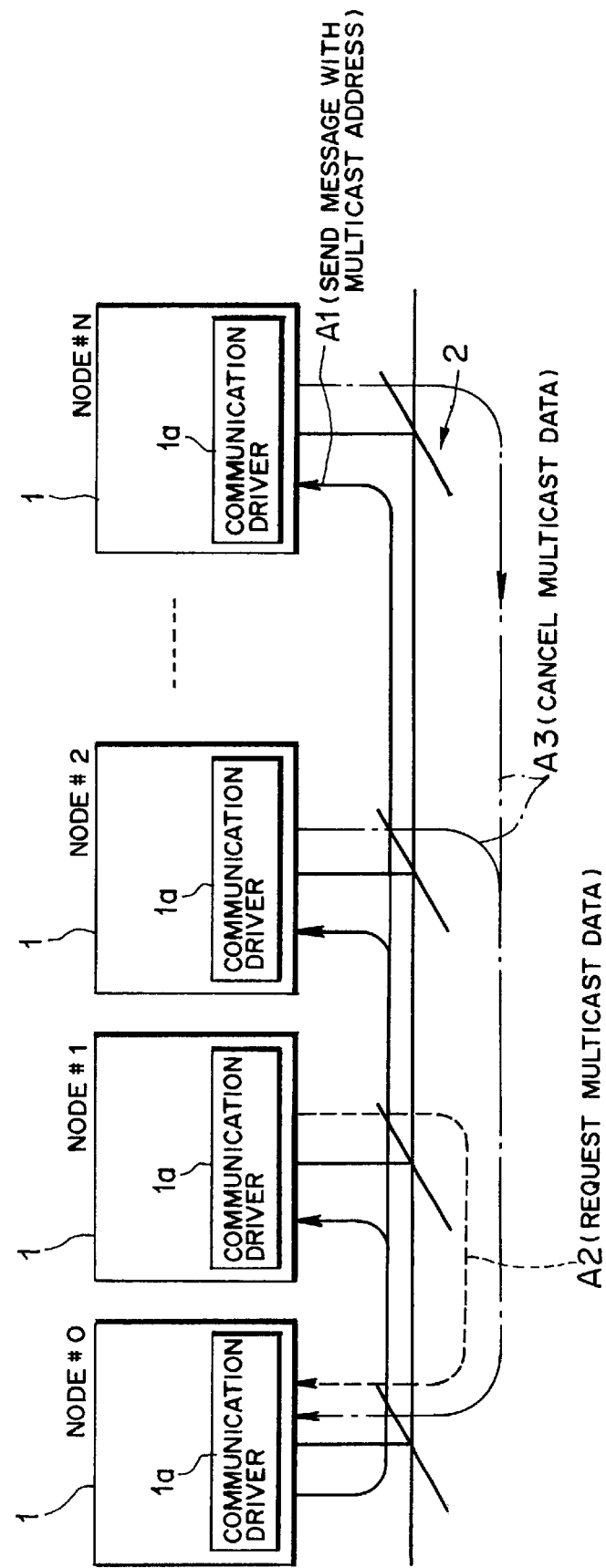

MULTICAST TRANSMISSION METHOD

BACKGROUND OF THE INVENTION

1) Field of the Invention

The present invention relates to a multicast transmission method of transmitting data to a plurality of nodes (computers, terminals) belonging to a specific group in a communication network based upon a protocol such as TCP/IP (Transmission Control Protocol/Internet Protocol).

2) Description of the Related Art

In recent years, with the progress of distributed processing computer networks, a need to simultaneously send the same data to a plurality of nodes has increased for the purpose of improving the processing efficiency. In the case of 1-to-N (one-to-many) or N-to-N communications (for example, for the execution of an application such as a television conference at a plurality of nodes), such a situation as to transmit the same data to a plurality of nodes grows as compared with one-to-one communications. For coping with such a situation, computer networks employ a multicast function to concurrently forward data a plurality of modes pertaining to a specific group.

In general, the Ethernet has been known as the typical protocol for the LAN (Local Area Network) constituting a computer network. In this Ethernet, for realizing the aforesaid multicast function, a group address (multicast address) is first set and registered in a communication driver of each of the nodes pertaining to a specific group (multicast group). Subsequently, a node, which transmits data, broadcasts transmission data including an address designating the specific group toward all the nodes except the data transmitting node. The communication driver of each of the nodes receiving the data decides whether or not the address given to the transmitted data coincides with an address assigned previously to its own terminal. If the coincidence between the both addresses takes place, the communication driver accepts that data, whereas, if no coincidence occurs, it abandons the same data.

In addition, Japanese Patent Laid-Open (Kokai) No. Hei 5-324545 discloses a technique (a bus control system for easily realizing the initial connection procedure in broadcasting) to designate a receive terminal group to which data should be transmitted. In the technique disclosed in this publication, a group address signal line is provided in buses for establishing connections among all the terminals (nodes), while a group address representative of a group each of the terminals belongs to is assigned in advance to that terminal. Further, in transmitting data to only a specific group, a transmission terminal first broadcasts the group address designating the specific group through the group address signal lines to all the terminal other than this transmission terminal. Each of the receive terminals receiving the group address checks whether or not the group address transmitted coincides with its own group address set in advance. The receive terminal, whose group address agrees with the transmitted group address, goes into a receive ready condition. Following this, the transmission terminal side starts to send (broadcast) data to the receive terminal belonging to the specific group.

However, with the multicast transmission method on the Ethernet, the data to be transmitted to the nodes belonging to a specific group is broadcasted in a state where a group address is given thereto, along with the imposition of a burden on the processing on the transmission side or on the reception side, the network or nodes having no relation also undergo its influence, and the traffic in the whole communication network increases.

The multicast communication targets the multimedia including moving picture data. The moving picture data commonly requires the transmission of 30 scenes (frames) per second, which produces an extremely large volume of data. Accordingly, in the case of a large volume of data such as such moving picture data or voice data being transmitted according to the above-mentioned multicast communication method, a significant increase in the traffic in the whole communication network takes place.

Moreover, the technique disclosed in Japanese Patent Laid-Open (Kokai) No. Hei 5-324545 is designed such that a transmission terminal designates a receive terminal belonging to a specific group to make it go into a receive ready condition before the transmission terminal side broadcasts data and the terminal being in the receive ready condition (that is, the receive terminal pertaining to the specific group) receives the broadcasted data. However, since the transmission from the transmission terminal to the receive terminal fully depends upon the broadcasting, the traffic on the communication network increases, and the transmission of a large volume of data such as moving picture data and voice data according to the aforesaid technique causes a remarkable increase in the traffic on the communication network.

SUMMARY OF THE INVENTION

It is therefore an object of the present invention to provide a multicast transmission method which is capable of realizing a multicast function while minimizing the traffic on a communication network concurrently with maintaining the independence of each of nodes through the use of the existing communication primitive such as the SEND-GET which will concretely be described herein later.

For this purpose, in accordance with the present invention, there is provided a multicast transmission method of, in a system in which a plurality of nodes are connected through a communication network to each other to be mutually communicable, making a data transmitting node of the plurality of nodes, in which a multicast transmission request occurs, transmit data to a node of said plurality of nodes, which belongs to a specific group through the communication network, wherein each of the plurality of nodes includes a communication driver having, as a basic communicating function, a function to issue and send a data send message for sending data to a receive buffer defined in advance in a data receiving node, a data get (acquisition) command for designating data in a memory of a given node to make a request for a transmission of the data to the node, and a data send command for designating a memory address in a data receiving node to transmit data, and when a node belongs to the specific group, a multicast address designating the specific group is set and registered in a multicast table included in the node belonging to the specific group, and the data transmitting node broadcasts the data send message, to which the multicast address designating the specific group is added, through the communication network to all the plurality of nodes while each of the nodes receiving the multicast address through the data send message refers to its own multicast table to decide whether or not a multicast address coincident with the received multicast address exists within the multicast table, and a node, in which the same multicast address exists within the multicast table, serves as a data receiving node to make a request for a transmission of the data corresponding to the multicast transmission request to the data transmitting node through the use of the basic communication function so that the data is transmitted from the data transmitting node to the node serving as the data receiving node.

At this time, it is also appropriate that the data receiving node that the multicast address exists within the multicast table issues and sends the data get command, the data send message or the data send command to the data transmitting node to make a request for the transmission of the data corresponding to the multicast transmission request so that the data is transmitted from the data transmitting node to the data receiving node.

Furthermore, it is also appropriate that the node in which the multicast address does not exist within the multicast table issues and sends the data send command, the data get command or the data send message to the data transmitting node to inform the data transmitting node of the fact that the transmission of the data corresponding to the multicast transmission request is unnecessary. On the other hand, it is also acceptable that the node in which the multicast address does not exist within the multicast table immediately terminates its processing without informing the data transmitting node of the fact that the transmission of the data responding to the multicast transmission request is unnecessary.

With the multicast transmission method according to this invention, only the transmission of a small quantity of data at the multicast address is made in the broadcasting way and the transmission of the multicast data is done in the one-to-one relation between the data transmitting node and each of the nodes being the target of the multicast transmission, thus readily accomplishing the multicast function between the nodes while minimizing the traffic on the communication network.

Still further, since the decision as to whether or not each of the nodes is the target of the multicast transmission is made through the use of the multicast table, it is possible to realize the multicast function while maintaining the independence of each of the nodes.

BRIEF DESCRIPTION OF THE DRAWINGS

FIGS. 1A and 1B are flow charts useful for explaining a multicast transmission method according to an embodiment of the present invention;

FIG. 2 is a block diagram showing an arrangement of a communication network system to which the multicast transmission method of the embodiment of this invention is applied, and also, is an illustration for describing an operation of the same communication network system;

DESCRIPTION OF THE PREFERRED EMBODIMENT

An embodiment of the present invention will be described hereinbelow with reference to the drawings.

In general, in a high-speed communication network (for example, AP-Net) making a communication speed above 1600 Mbps, a PUT command or a GET command is put to use for the data copy (memory copy) between nodes through the communication network.

Figure 10:
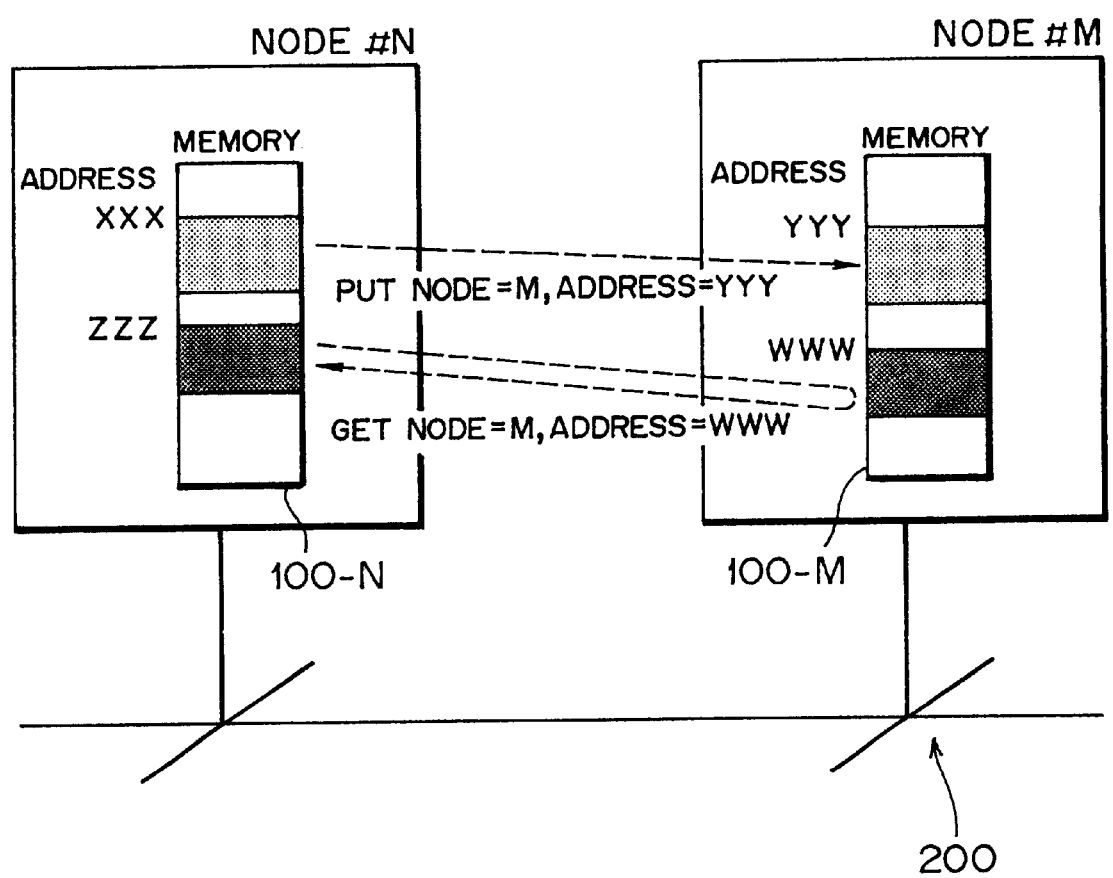
FIG. 10 is a block diagram showing a principal portion of a common communication network system for explaining a PUT command and a GET command.

In this case, as shown in FIG. 10, a node #N forwards the data at an address XXX in a memory 100-N to a node #M, the PUT command (data send command) is issued from the node #N to the node #M. That is, in a manner that the node #N designates an ID (in this example, M) of the data receiving node #M being the destination of the data and a data-copied address YYY in a memory 100-M of the node #M and issues the PUT command, the data laying at the address XXX in the memory 100-N of the node #N transferred and copied through a communication network 200 into the address YYY in the memory 100-M of the node #M.

On the other hand, as shown in the same illustration, when the node #N gets (copies) the data at an address WWW in the memory 100-M of the node #M, the GET command (data get command) is issued from the node #N to the node #M. That is, in a manner that the node #N designates an ID (in this example, M) of the node #M retaining the target data and the address WWW designating the target data and issue the GET command, the data existing at the address WWW in the memory 100-M of the node #M is copied through the communication network 200 into an address ZZZ in the memory 100-N of the node #N.

Figure 11:
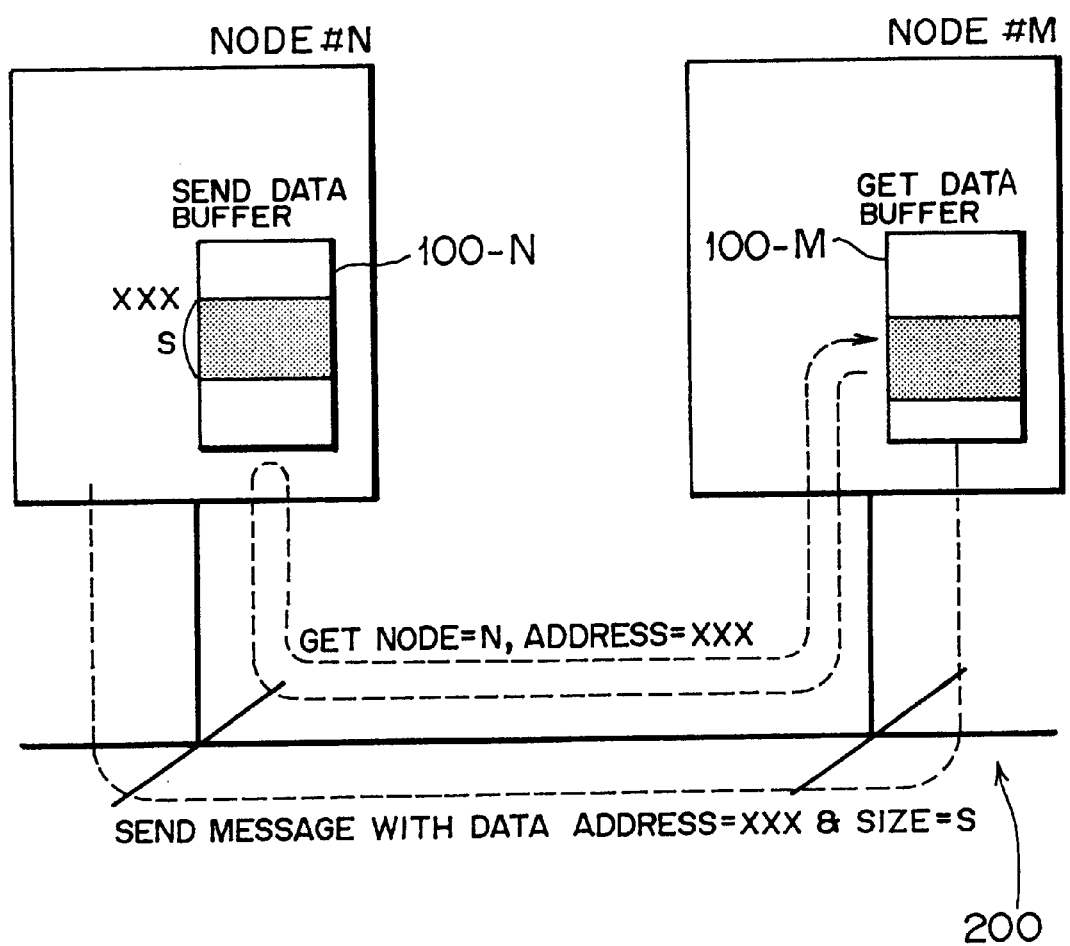
FIG. 11 is a block diagram showing a principal portion of a common communication network system for explaining a communication method based upon a SEND-GET.

Usually, the aforesaid GET command is used in the form of a combination with a SEND message as shown in FIG. 11, and a communication mode based upon this combination is called SEND-GET. Besides, the SEND message (data send message) is used when the data of a data transmitting node is forwarded to a receive buffer defined in advance by a data receiving node.

Furthermore, in the communication mode based on the SEND-GET, as shown in FIG. 11, the SEND message retaining the address XXX of the transmission data on the memory (SEND DATA BUFFER) 100-N and the size S of that data is transmitted from the data transmitting node #N to the data receiving node #M.

In the node #M, the SEND message taken from the node #N through the communication network 200 is once stored in a receive buffer (not shown). Subsequently, after the contents of the SEND message are deciphered or decoded in a communication driver (not shown), a data write area according to the size S is secured on the memory (GET DATA BUFFER) 100-M, before the GET command is issued to the node #N so that the data at the address XXX in the memory 100-N is forwarded to the node #M. The data sent from the node #N through the communication network 200 in response to this GET command is written into the area of the designated address (the aforesaid data write area) in the memory 100-M of the node #M.

Through the use of the communication driver employing the SEND-GET or the PUT command as a basic communication function, the data transmitting node can designate an arbitrary address in a memory to directly transmit data to that address, thus enabling the effective execution of data copy between nodes to enhance the communication performance and, further, facilitating the buffer management in each of the nodes.

This invention is for developing and establishing a method of realizing a multicast function by utilizing the existing basic communication function issuing a SEND message, a GET command and a PUT command, and this method can minimize the traffic in the whole communication network concurrently with maintaining the independence of each of the nodes.

FIG. 2 is a block diagram showing an arrangement of a communication network system to which a multicast transmission method according to the embodiment of this invention is applied, and is also an illustration available for explaining an operation of this communication network system. In the communication network system according to this embodiment shown in FIG. 2, a plurality of nodes 1 (#0 to #N) are connected through a communication network (for example, AP-Net) 2 using, for example, TCP/IP to each other to be communicable mutually.

Each of the nodes 1 is equipped with a communication driver (data link driver; for example, AP-Net driver) 1a for directly giving and taking signals to/from the communication network 2 to accomplish the transmission/reception of data.

This communication driver 1a is employed as a basic communication function (which will sometimes be referred hereinafter to as a communication primitive) including a function (including a communication mode based on SEND-GET) to issue and send the SEND message, the GET command and the PUT command mentioned before with reference to FIGS. 10 and 11. As mentioned previously, the SEND message (data send message) is for transmitting data to a receive buffer defined in advance by the data transmitting node, and the GET command (data get command) is for designating data in a memory (send data buffer 4 which will be described herein later) of a given node to make a request for the transmission of that data to the corresponding node, and further, the PUT command (data send command) is for designating a memory address in a receiving (destination) node and for transmitting data.

In addition, as shown in FIGS. 3 to 9, each of the nodes 1 is provided with a multicast table 3, a send (transmission) data buffer 4, a receive/get (acquisition) data buffer 5 and a multicast transmission table 6. In FIGS. 3 to 9, a data transmitting node 1 is shown as a node #n while one of data receiving nodes 1 pertaining to a multicast group is shown as a node #m, and only components needed at the transmission in each mode are illustrated in the node #n while only components necessary at the reception in each mode are illustrated in the node #m. Further, in FIGS. 3 to 9, the communication driver 1a of the nodes 1 are omitted from the illustration.

In this case, the multicast table 3 is made in such a manner that, when a node 1 possessing this multicast table 3 belongs to a multicast group (specific group), a multicast address (group address) of the group it belongs to is set and registered beforehand. Incidentally, in a multicast transmission based upon the TCP/IP, of IP addresses each comprising 32 bits, an address whose leading four bits is "1110" is recognized as a multicast address. That is, the range of 224.0.0.0 to 239.255.255.255 is made to be allocated to the multicast addresses.

The send data buffer (memory) 4 stores data (for example, multicast data) to be transmitted, while the receive/get data buffer (memory) 5 stores data received or acquired from a data transmitting node.

The multicast transmission table 6 is made in such a manner that a flag (YES/NO) for recognizing a node (data receiving node) which is the target of the multicast transmission is set at every node 1 other than its own node, with that flag being set by a PUT command or a SEND message from a data receiving node as will be mentioned later.

The multicast table 3, the send data buffer 4, the receive/get data buffer 5 and the multicast transmission table 6 are incorporated into or provided in association with the communication driver 1a of each of the node 1.

Secondly, referring to FIGS. 1 to 9, a description will be given hereinbelow of a multicast transmission method for use in the communication network system thus arranged according to this embodiment.

The description will start with a basic procedure of the multicast transmission method according to this embodiment, that is, a basic operation for the multicast transmission by the communication driver 1a of each of the nodes 1, with reference to the flow charts shown in FIGS. 1A and 1B in view of FIG. 2.

FIG. 1A is a flow chart (steps S0 to S3 and S31) available for describing a basic transmission processing procedure to be conducted in each of the nodes 1. As illustrated in FIG. 1A, the communication driver 1a of each of the nodes 1 always decides whether a transmission request occurs or not (step S0), and if it occurs (YES route from step S0), checks whether or not the transmission request signifies a multicast transmission request (step S1).

When receiving the multicast transmission request (YES route from step S1), the communication driver 1a adds a multicast address corresponding to that multicast transmission request to a SEND message and broadcasts the SEND message plus multicast address to all the nodes 1 (step S2; see a thin solid line drawn arrow A1 "SEND MESSAGE WITH MULTICAST ADDRESS" in FIG. 2). At this time, the data volume of the SEND message with the multicast address is considerably small, with the result that the traffic on the communication network 2 hardly undergoes the influence of the broadcast of the SEND message.

Furthermore, the communication driver 1a transmits multicast data to the node (node pertaining to a multicast group; data receiving node) 1 which issues the request for the data transmission in response to the broadcasted SEND message (step S3).

On the other hand, if the answer of the step S1 shows that the transmission request does not assume the multicast transmission request (NO route from step S1), the communication driver 1a conducts the transmission processing in answer to that transmission request (step S31).

Meanwhile, FIG. 1B is a flow chart (steps S32, S4 to S7 and S41) useful for explaining a basic transmission processing procedure to be done in each of the nodes 1. As shown in FIG. 1B, the communication driver 1a of each of the nodes 1 always decides whether data arrives (is received) or not (step S32), and if the data comes (YES route from step S32), checks whether or not that data is a SEND message with a multicast address (step S4).

When the node 1 (communication driver 1a) receives the SEND message with the multicast address (YES route from step S4), the communication driver la refers to the multicast table 3 (see FIGS. 3 to 9) to compare the multicast address added to the SEND message it receives with a set address within the multicast table 3 for deciding whether or not that multicast address exists within the multicast table 3 (step S5).

If that multicast address exists within the multicast table 3 (YES route from step S5), the communication driver 1a issues a request for the transmission of multicast data (data responding to a multicast transmission request a data transmitting node issues) to a data transmitting node transmitting the SEND message through the use of a communication primitive (the generation and delivery of a GET command, a SEND message or a PUT command) (see a dotted line drawn arrow A2 "REQUEST MULTICAST DATA" to make the data transmitting node transmit the data to its own node (step S6). The data transmission request method using the communication primitive (a GET command, a SEND message or a PUT command) in this step S6 will be described herein later with reference to FIGS. 3 to 5.

On the other hand, if the multicast address does not exist within the multicast table 3 (NO route from step S5), the communication driver 1a informs the data transmitting node transmitting the SEND message of the fact that the transmission of the multicast data is unnecessary, through the use of the communication primitive (the generation and delivery of a PUT command, a GET command or a SEND message) (step S7; see a dashed line drawn arrow A3 "CANCEL MULITICAST DATA". The data transmission cancel notifying method using the communication primitive (a PUT command, a GET command or a SEND message) in this step S7 will be described herein later with reference to FIGS. 6 to 8.

Besides, as will be mentioned herein later, the communication driver la can also immediately terminate its processing without informing of no need for the data transmission. In this case, the step S7 is omissible.

Furthermore, if the decision of the step S4 indicates that the reception data is not the SEND message with the multicast address (NO route from step S4), the communication driver la pertinently processes the data it receives in accordance with its contents (step S41).

Referring to FIG. 2, a description will be taken hereinbelow of a series of multicast transmission operations according to this embodiment. As indicated by the thin solid line drawn arrow Al, a data transmitting node #0 in which a multicast transmission request occurs adds a multicast address to a SEND message and broadcasts the SEND message plus multicast address to nodes #1 to #N through the processing of the step S2 in FIG. 1A.

Each of the nodes #i (i=1 to N) receiving the multicast address compares that multicast address with a set address within the multicast table 3 through the processing of the step S5 in FIG. 1B to check whether or not that multicast address exists within the multicast table 3.

The node #1 in which the multicast address exists within its multicast table 3 makes a request for the transmission of the corresponding multicast data toward the data transmitting node #0 by the use of a communication primitive (a GET command, a SEND message or a PUT command) through the processing of the step S6 in FIG. 1B as indicated by the dotted line drawn arrow A2, so that the data transmitting node #0 forwards the multicast data to the node #1.

On the other hand, the node #2 or #N in which the multicast address does not exist within its multicast table 3 informs the data transmitting node #0 of the fact of no need for the transmission of the multicast data by the use of a communication primitive (a PUT command, a GET command or a SEND message) through the processing of the step S7 in FIG. 1B as indicated by the dashed line drawn arrow A3.

Thus, it is possible to accomplish the multicast transmission from the data transmitting node #0, in which the multicast transmission request occurs, to the data receiving node #1 belonging to the multicast group in answer to the multicast transmission request.

Moreover, referring to FIGS. 3 to 5, a description will be made hereinbelow of data transmission request methods (the processing of the step S6 in FIG. 1B) using a GET command, a SEND message or a PUT command which constitutes a communication primitive. In each of the examples shown in FIGS. 3 to 5, let it be assumed that a data transmitting node #n attaches a multicast address, for example, "224.0.0.2" to a SEND message to broadcast the SEND message plus multicast address and this address "224.0.0.2" exists within the multicast table 3 of a node #m.

Figure 3:
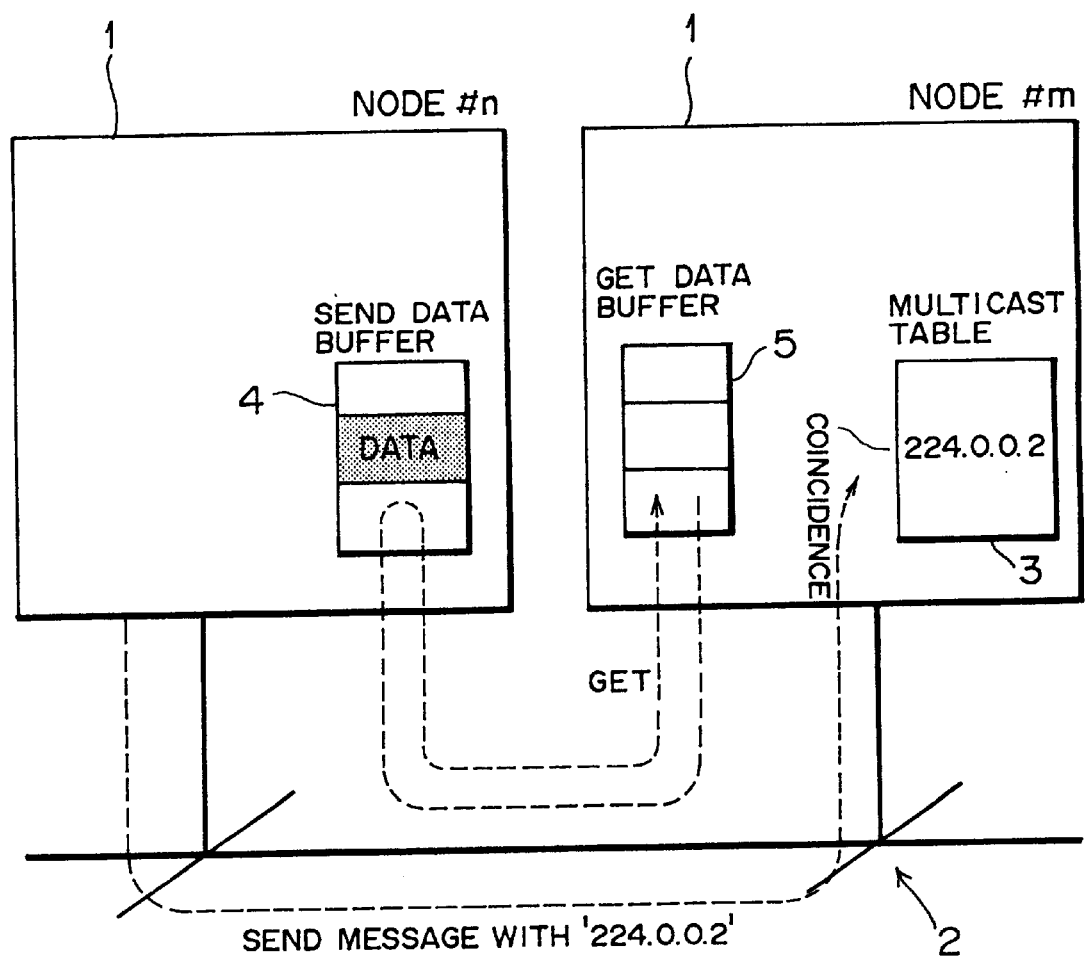
FIG. 3 is a block diagram showing a principal portion of the communication network system according to this embodiment for describing a first data transmission request method.

In a first data transmission request method shown in FIG. 3, the node #m issues a GET command toward the data transmitting node #n to make a request for the transmission of multicast data, so that the communication driver 1a (see FIG. 2) causes the multicast data in the send data buffer 4 of the data transmitting node #n to be forwarded through the communication network 2 to the node #m and to be put at a designated address in the receive/get data buffer 5 of the node #m.

Figure 4:
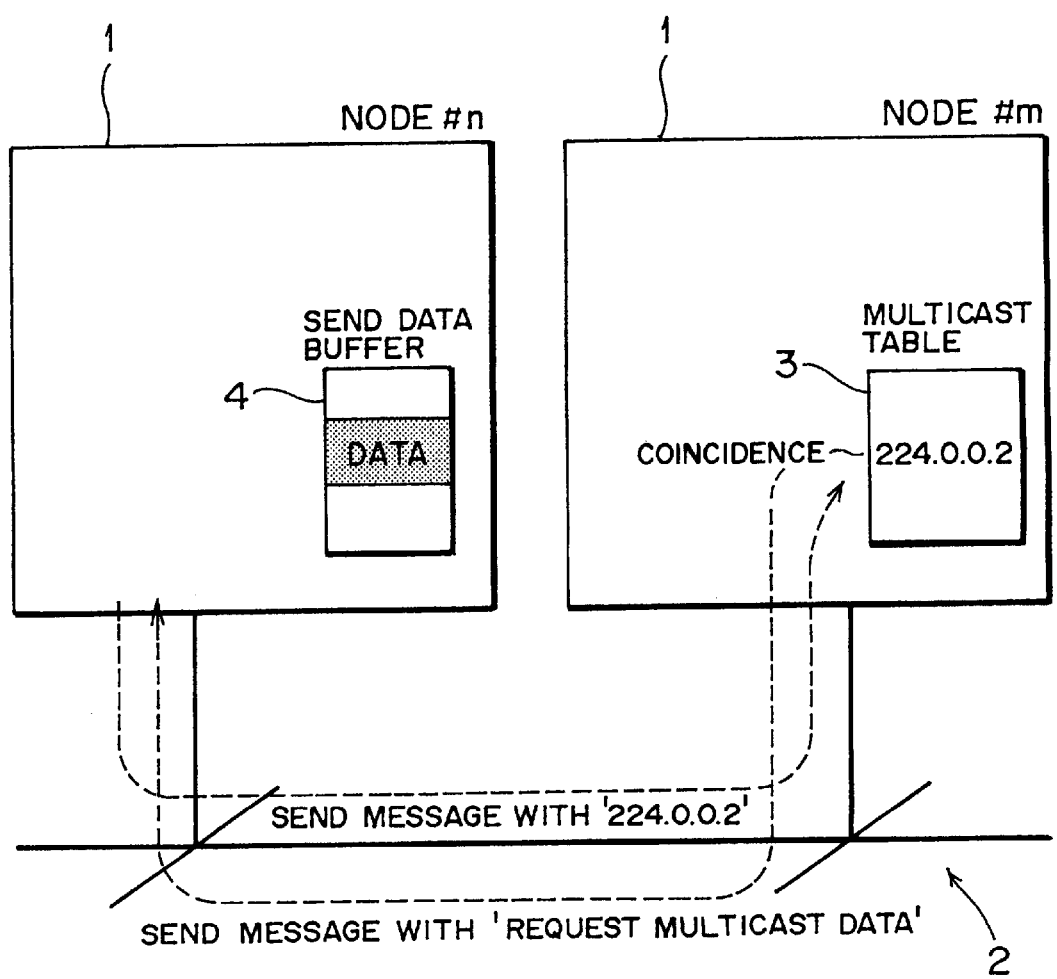
FIG. 4 is a block diagram showing a principal portion of the communication network system according to this embodiment for describing a second data transmission request method.
Figure 5:
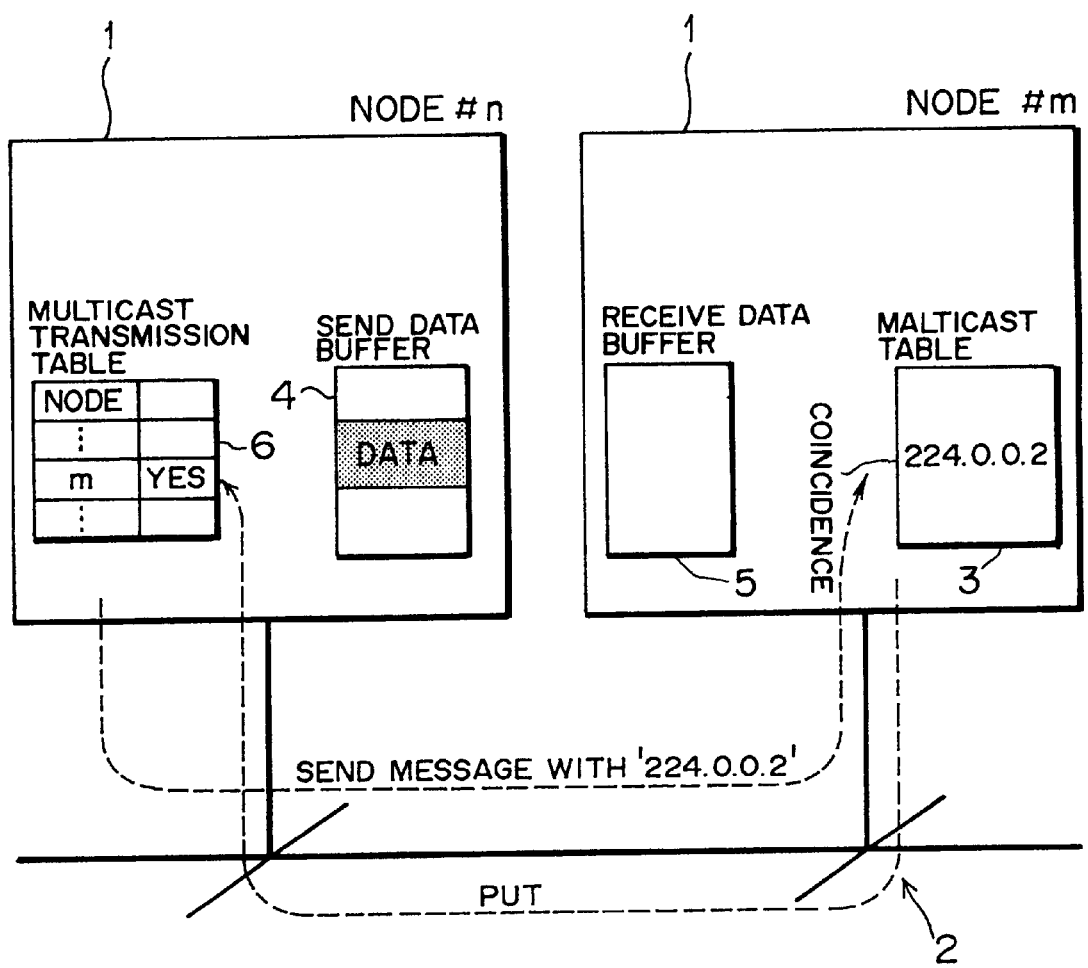
FIG. 5 is a block diagram showing a principal portion of the communication network system according to this embodiment for describing a third data transmission request method.

Furthermore, in a second data transmission request method shown in FIG. 4, the node #m sends a SEND message with a multicast data transmission request ("REQUEST MULTICAST DATA" to the data transmitting node #n to make a request for the transmission of multicast data thereto, whereupon the communication driver 1a (see FIG. 2), after deciphering that message, causes the multicast data in the send data buffer 4 of the data transmitting node #n to be forwarded through the communication network 2 to the node #m.

Still further, in a third data transmission request method, the node #m issues a PUT command to the data transmitting node #n for making a request for the transmission of the multicast data, whereupon "YES" (flag ON) is put in a column pertinent to the node #m in the multicast transmission table 6 of the data transmitting node #n. Referring to the multicast transmission table 6 to confirm that the flag of the node #m is in the ON state, if so, the communication driver la (see FIG. 2) of the data transmitting node #n transmits the multicast data in the send data buffer 4 through the communication network 2 to the node #m.

Meanwhile, the data transmitting node 1, which broadcasts a SEND message with a multicast address, expects the response from all the nodes 1 forming the broadcasting targets. Thus, in this embodiment, as mentioned previously, the node(s) 1 in which the multicast address does not exist within its multicast table 3 also informs the data transmitting node 1 of the fact that the transmission of the multicast data is unnecessary through the use of a PUT command, a GET command or a SEND message.

Moreover, referring to FIGS. 6 to 9, a description will be made hereinbelow of data transmission cancel notifying methods (the processing of the step S7 in FIG. 1B) using a PUT command, a GET command or a SEND message which constitutes a communication primitive, and of the case of no notification of the data transmission cancel. In each of the examples shown in FIGS. 6 to 9, let it be assume that the data transmitting node #n adds a multicast address, for example, "224.0.0.2" to a SEND message to broadcasts the SEND message plus multicast address and that address does not coincide with an address "224.0.0.3" registered in the multicast table 3 of the node #m, that is, the address "224.0.0.2" does not exist within the multicast table 3 of the node #m.

Figure 6:
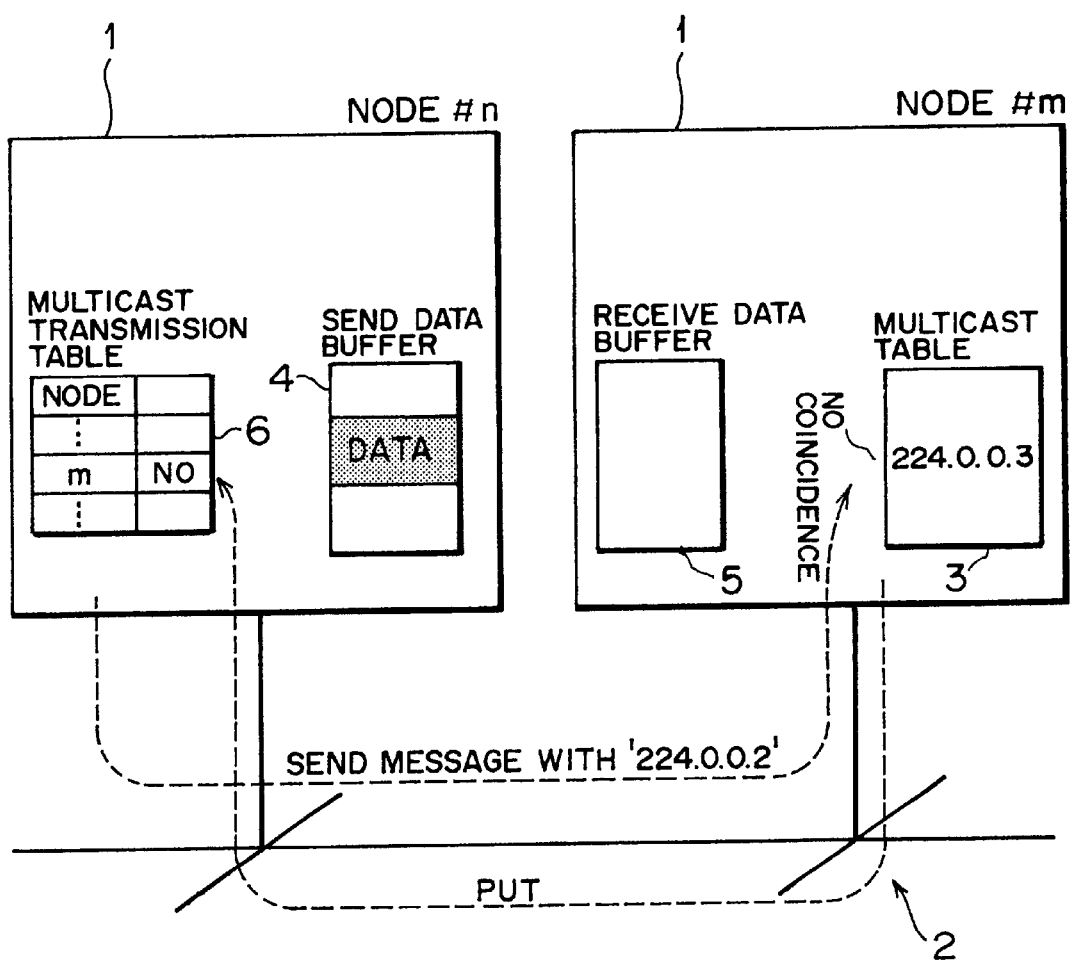
FIG. 6 is a block diagram showing a principal portion of the communication network system according to this embodiment for explaining a first data transmission cancel notifying method.

In a first data transmission cancel notifying method shown in FIG. 6, the node #m issues a PUT command to the data transmitting node #n to inform it of the fact that the transmission of the multicast data is unnecessary so that "NO" (flag OFF) is placed in a column for the node #m in the multicast transmission table 6 of the data transmitting node #n. The communication driver 1a (see FIG. 2) of the data transmitting node #n refers to the multicast transmission table 6, and if the flag of the node #m is the OFF state, inhibits the transmission of the multicast data to the node #m.

Figure 7:
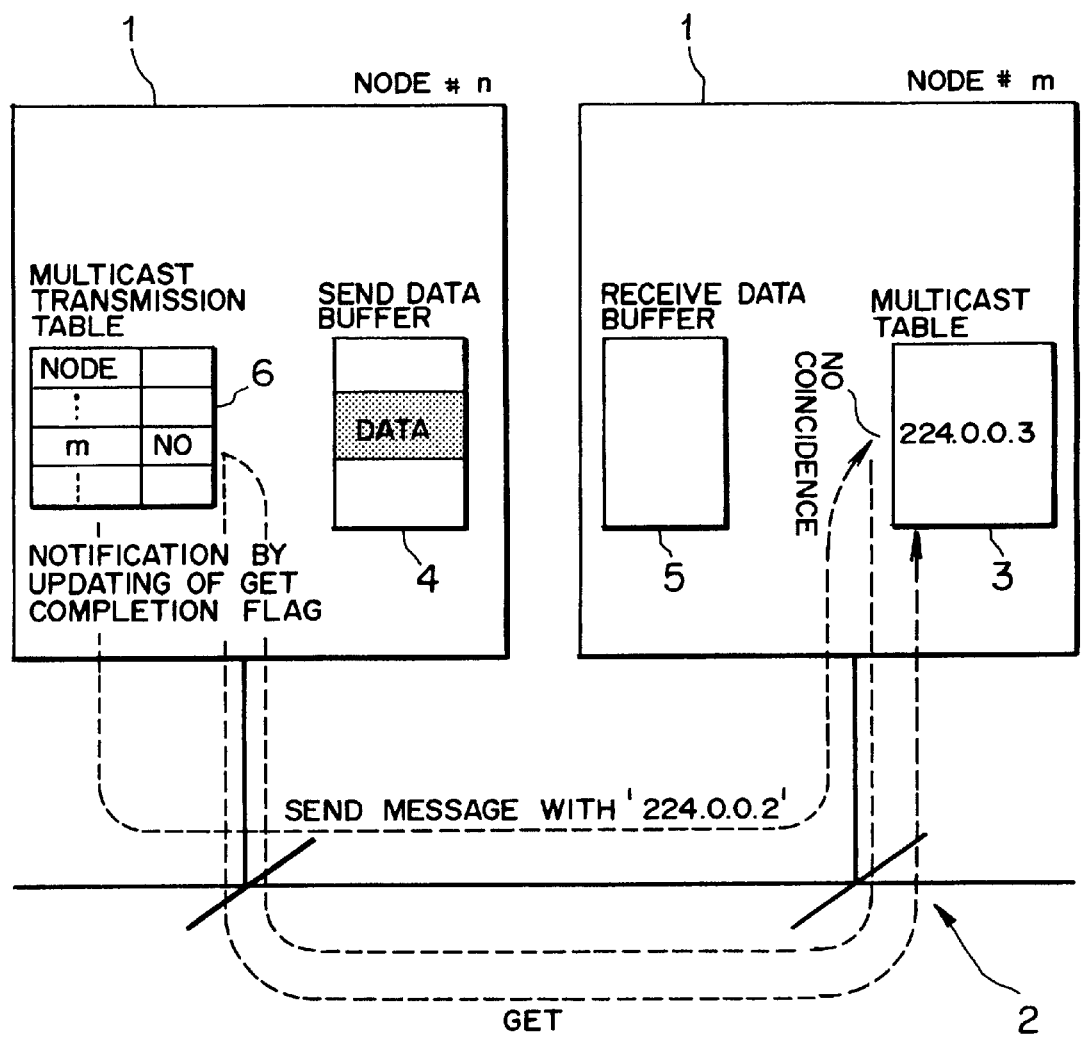
FIG. 7 is a block diagram showing a principal portion of the communication network system according to this embodiment for explaining a second data transmission cancel notifying method.

In a second data transmission cancel notifying method shown in FIG. 7, the node #m issues a GET command to the data transmitting node #n to inform it of the fact that the transmission of the multicast data is unnecessary (the information is made through the updating of a GET command completion flag) so that "NO" (flag OFF) is placed in a column for the node #m in the multicast transmission table 6 of the data transmitting node #n. The communication driver 1a (see FIG. 2) of the data transmitting node #n refers to the multicast transmission table 6, and if the flag of the node #m is the OFF state, inhibits the transmission of the multicast data to the node #m.

Figure 8:
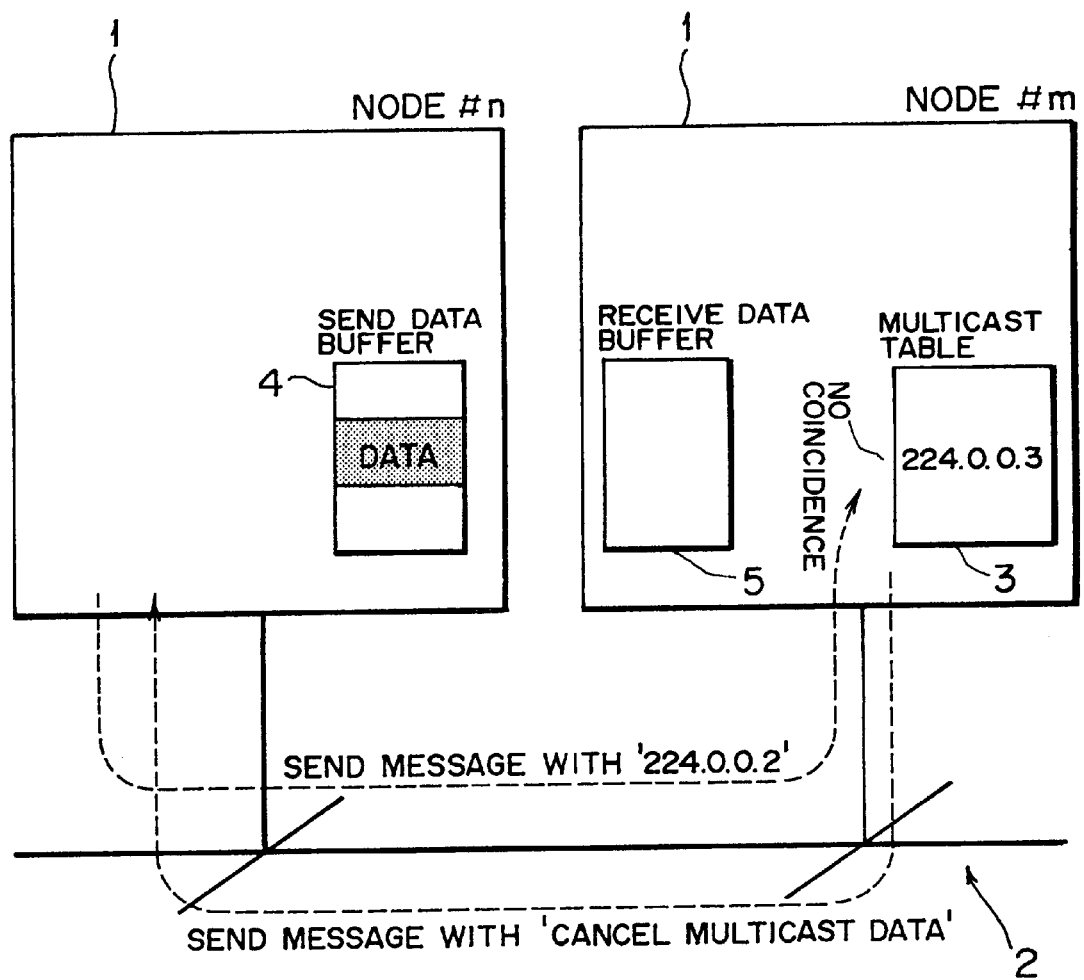
FIG. 8 is a block diagram showing a principal portion of the communication network system according to this embodiment for explaining a third data transmission cancel notifying method.

In a third data transmission cancel notifying method shown in FIG. 8, the node #m issues a SEND message with multicast data transmission non-requirement information ("CANCEL MULTICAST DATA") to the data transmitting node #n to inform it of the fact that the transmission of the multicast data is unnecessary. The communication driver 1a (see FIG. 2), decoding that message, does not transmit the multicast data to the node #m.

Figure 9:
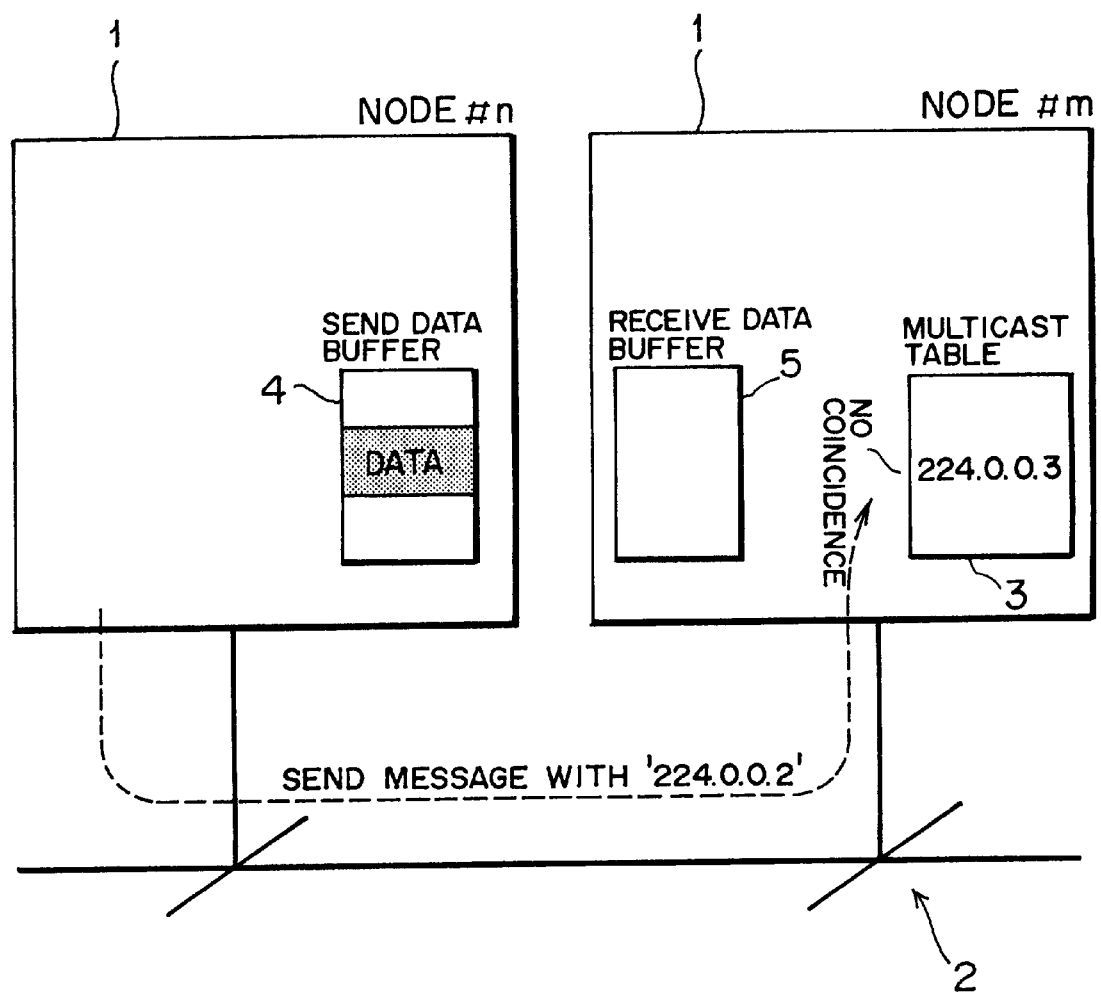
FIG. 9 is a block diagram showing a principal portion of the communication network system according to this embodiment for explaining a method to be taken in the case of no notification of data transmission cancel.

Besides, it is also appropriate that, as shown in FIG. 9, the node #m immediately terminates the processing without issuing the data transmission cancel notification to the data transmitting node #n. However, in this case, since the data transmitting node #n side waits for the response from the node #m, there is a need to add an arrangement made such that a timer is provided so that, when there is no response from the node #m for a given period of time, the data transmitting node #n side assumes that the transmission of the multicast data to the node #m is unnecessary.

As described above, in the multicast transmission method according to an embodiment of this invention, a data transmitting node 1 in which a multicast transmission request occurs adds a multicast address to a SEND message and broadcasts the SEND message plus multicast address toward all the nodes, and only the node(s) 1 having a previously set address coincident with the multicast address issues and sends a GET command, a SEND message or a PUT command to actively make a request for the transmission of the multicast data to the data transmitting node 1, and therefore, the multicast data transmission is achieved in one-to-one relation between the data transmitting node 1 and each of the nodes being the target of the multicast transmission. At this time, since the broadcast of the SEND message hardly affects the traffic on the communication network 2 as mentioned before, it is possible to realize a multicast function among the nodes 1 while minimizing the traffic on the communication network 2.

In addition, according to this embodiment, since the decision as to which the target of the multicast transmission is depends upon the use of the multicast table 3 in each of the nodes 1, it is possible to realize a multicast function concurrently with maintaining the independence of each of the nodes.

It should be understood that the present invention is not limited to the above-described embodiment, and that it is intended to cover all changes and modifications of the embodiment of the invention herein which do not constitute departures from the spirit and scope of the invention.

For instance, although, in the above-described embodiment, this invention is applied to a communication network based upon TCP/IP, this invention is not limited to this, but is likewise applicable to any communication network employing a protocol defining a SEND message, a GET command and a PUT command, and in this case, the same effects are obtainable.

What is claimed is:

1. A multicast transmission method of, in a system in which a plurality of nodes are connected through a communication network to each other to be mutually communicable, making a data transmitting node of said plurality of nodes, in which a multicast transmission request occurs, transmit data to a node of said plurality of nodes, which belongs to a specific group, through said communication network, wherein each of said plurality of nodes includes a communication driver having, as a basic communicating function, a function to issue and send a data send message for sending data to a receive buffer defined in advance in a data receiving node, a data get command for designating data in a memory of a given node to make a request for a transmission of said data to the given node, and a data send command for designating a memory address in a data receiving node to transmit data, and when a node belongs to said specific group, a multicast address designating said specific group is set and registered in a multicast table included in the node belonging to said specific group, and said data transmitting node broadcasts said data send message, to which said multicast address designating said specific group is added, through said communication network to all said plurality of nodes while each of said nodes receiving said multicast address through said data send message refers to its own multicast table to decide whether or not a multicast address coincident with the received multicast address exists within said multicast table, and a node, in which the same multicast address exists within said multicast table, serves as a data receiving node to make a request for a transmission of data corresponding to said multicast transmission request to said data transmitting node through the use of said basic communication function so that said data is transmitted from said data transmitting node to the node serving as said data receiving node.

2. A multicast transmission method as defined in claim 1, wherein said data receiving node, in which said multicast address exists within said multicast table, issues said data get command to said data transmitting node to make a request for transmission of said data corresponding to said multicast transmission request so that said data is transmitted from said data transmitting node to said data receiving node.

3. A multicast transmission method as defined in claim 1, wherein said data receiving node, in which said multicast address exists within said multicast table, sends said data send message to said data transmitting node to make a request for transmission of said data corresponding to said multicast transmission request so that said data is transmitted from said data transmitting node to said data receiving node.

4. A multicast transmission method as defined in claim 1, wherein said data receiving node, in which said multicast address exists within said multicast table, issues said data send command to said data transmitting node to make a request for transmission of said data corresponding to said multicast transmission request so that said data is transmitted from said data transmitting node to said data receiving node.

5. A multicast transmission method as defined in claim 1, wherein said node, in which said multicast address does not exist within said multicast table, issues said data send command to said data transmitting node to inform said data transmitting node of the fact that transmission of said data corresponding to said multicast transmission request is unnecessary.

6. A multicast transmission method as defined in claim 1, wherein said node, in which said multicast address does not exist within said multicast table, issues said data get command to said data transmitting node to inform said data transmitting node of the fact that transmission of said data corresponding to said multicast transmission request is unnecessary.

7. A multicast transmission method as defined in claim 1, wherein said node, in which said multicast address does not exist within said multicast table, sends said data send message to said data transmitting node to inform said data transmitting node of the fact that transmission of said data corresponding to said multicast transmission request is unnecessary.

8. A multicast transmission method as defined in claim 1, wherein said node, in which said multicast address does not exist within said multicast table, immediately terminates its processing without informing said data transmitting node of the fact that transmission of said data corresponding to said multicast transmission request is unnecessary.

* * * * *